United States Patent
Buis et al.

(10) Patent No.: US 12,110,090 B2
(45) Date of Patent: Oct. 8, 2024

(54) SYSTEM AND METHODS FOR HEAT TREATMENT OF BALLAST FLUID

(71) Applicant: Fineline, LLC, Merced, CA (US)

(72) Inventors: Carver Buis, Fresno, CA (US); Shane Stillman, Le Grand, CA (US)

(73) Assignee: Fineline, LLC, Merced, CA (US)

( * ) Notice: Subject to any disclaimer, the term of this patent is extended or adjusted under 35 U.S.C. 154(b) by 189 days.

(21) Appl. No.: 17/197,463

(22) Filed: Mar. 10, 2021

(65) Prior Publication Data
US 2022/0289356 A1 Sep. 15, 2022

(51) Int. Cl.
*B63J 4/00* (2006.01)
*B63B 13/00* (2006.01)
(Continued)

(52) U.S. Cl.
CPC ............... *B63J 4/002* (2013.01); *B63B 13/00* (2013.01); *B63B 79/10* (2020.01); *C02F 1/008* (2013.01);
(Continued)

(58) Field of Classification Search
CPC .. B63J 4/002; B63J 13/00; B63J 79/10; C02F 1/008; C02F 1/02; C02F 2103/008;
(Continued)

(56) References Cited

U.S. PATENT DOCUMENTS 5,816,181 A * 10/1998 Sherman, Jr. ........... B63B 57/00
114/125
7,585,416 B2    9/2009 Ranade et al.
(Continued)

FOREIGN PATENT DOCUMENTS

CN    113264618 A  *  8/2021 .............. C02F 1/001
DE    10231734          1/2003
(Continued)

OTHER PUBLICATIONS

English translation of Kang KR101306596 B1 (Year: 2013).*
(Continued)

*Primary Examiner* — Fred Prince
(74) *Attorney, Agent, or Firm* — Metz Lewis Brodman Must O'Keefe (57) ABSTRACT

Heat treatment system and methods to decontaminate ballast fluid includes ballast tank(s) each having a temperature sensor. A heat source transfers heat to ballast fluid when circulated therethrough. Diverter valves provide selective direction of fluid flow to either the onboard heat source or external auxiliary heat source when connected. A pump moves ballast fluid between the ballast tank(s) and the heat source, recirculating ballast fluid for iterative heating. The temperature sensor provides ballast fluid temperature information in the ballast tank(s). Recirculation is stopped when ballast fluid meets predetermined ballast temperature conditions. A display provides decontamination status to an operator. A control unit monitors all sensors, valves and pumps to coordinate the performance of the heat treatment process and provide history report confirming decontamination.

18 Claims, 5 Drawing Sheets

(51) Int. Cl.
*B63B 79/10* (2020.01)
*C02F 1/00* (2023.01)
*C02F 1/02* (2023.01)
*C02F 103/00* (2006.01)

(52) U.S. Cl.
CPC .......... *C02F 1/02* (2013.01); *C02F 2103/008* (2013.01); *C02F 2201/005* (2013.01); *C02F 2209/006* (2013.01); *C02F 2209/02* (2013.01); *C02F 2209/42* (2013.01); *C02F 2301/046* (2013.01); *C02F 2303/04* (2013.01)

(58) Field of Classification Search
CPC ............ C02F 2201/005; C02F 2209/02; C02F 2209/42; C02F 2301/046; C02F 2303/04; C02F 2209/006; B63B 13/00; B63B 79/10
USPC .......................... 210/157, 739, 742, 774, 931
See application file for complete search history.

(56) References Cited

U.S. PATENT DOCUMENTS

| | | | |
|---|---|---|---|
| 10,246,174 B2 | 4/2019 | Stimmel et al. | |
| 2002/0050478 A1* | 5/2002 | Talbert | F28D 7/106 210/931 |
| 2007/0221362 A1 | 9/2007 | Stewart et al. | |
| 2009/0152183 A1* | 6/2009 | Stewart | A61L 2/04 165/279 |
| 2009/0321365 A1* | 12/2009 | Eriksson | B63J 4/004 210/744 |
| 2011/0179988 A1* | 7/2011 | Howard | B63G 8/08 114/337 |
| 2013/0068701 A1* | 3/2013 | Bain | C02F 1/20 210/194 |
| 2014/0021143 A1 | 1/2014 | Hummer | |
| 2014/0042061 A1* | 2/2014 | Wallace | C02F 9/00 210/175 |
| 2015/0298990 A1 | 10/2015 | Urke | |
| 2016/0318593 A1 | 11/2016 | Hummer | |
| 2018/0072390 A1* | 3/2018 | Hartman | B63B 34/70 |
| 2018/0317004 A1* | 11/2018 | Sheedy | H04R 3/04 |
| 2018/0354600 A1 | 12/2018 | Paras | |

FOREIGN PATENT DOCUMENTS

| | | | |
|---|---|---|---|
| JP | 2794537 | 9/1998 | |
| JP | 3660984 | 6/2005 | |
| JP | 2005186765 | 7/2005 | |
| KR | 101061564 | 9/2011 | |
| KR | 101306596 B1 * | 9/2013 | |
| KR | 101335264 B1 * | 12/2013 | |
| KR | 20140091995 A * | 7/2014 | |
| KR | 101926444 | 3/2019 | |
| WO | WO-0212125 A2 * | 2/2002 | ................ C02F 1/02 |
| WO | WO-2014077696 A1 * | 5/2014 | .............. B63J 4/002 |
| WO | WO-2018219429 A1 * | 12/2018 | ................ B63J 2/12 |
| WO | 2019134961 | 7/2019 | |
| WO | WO-2020138300 A1 * | 7/2020 | ............ B01F 1/0011 |

OTHER PUBLICATIONS

English Translation of Ishida JP3660984 B2 (Year: 2005).*
English Translation of Kim KR20140091995 A (Year: 2013).*
Yamamoto, WO2020138300A1, English machine translation (Year: 2020).*
Machine-generated English translation of CN 113264618, generated on Apr. 26, 2024.*
Machine-generated English translation of KR 101335264, generated on Apr. 26, 2024.*
Acomi, N. I. C. O. L. E. T. A., and S. Ghita. "Using heat treatment of ballast water for killing marine microorganisms." Annals of DAAAM for 2012 & Proceedings of the 23rd International DAAAM Symposium. vol. 23. No. 1. 2012. (Accessed Mar. 31, 2020).
Balaji, R., and O. Yaakob. "An analysis of shipboard waste heat availability for ballast water treatment." Journal of Marine Engineering & Technology 11.2 (2012): 15-29. (Accessed Mar. 31, 2020).
"Ping": Ship microwaves could beat ballast invaders (Accessed Mar. 31, 2020).
Appendix F Candidate Shipboard Treatment Technologies: Supplementary Information https://www.nap.edu/read/5294/chapter/14, (1996).

* cited by examiner

SYSTEM AND METHODS FOR HEAT TREATMENT OF BALLAST FLUID

FIELD OF THE INVENTION

This invention relates to marine vessels having ballast tanks or bags, and more particularly, to systems and methods of heat-treating ballast fluid from ballast tanks or bags to decontaminate such ballast fluid of aquatic invasive species.

BACKGROUND

Boats and other watercraft with engines often include ballast tanks or bags within the hull in which water is stored to provide balance and stability for the vessel while underway. Ballast water is often sourced from the water surrounding the vessel, being drawn into the ballast tanks in a process called ballasting. The ballast water must be changed periodically, either through removing the contents of the tank and replacing with new ballast water, or by exchanging a portion of used ballast water with new water in a continuous cycle for a period of time until sufficient replacement has occurred.

Ballast water also contains whatever marine plant and animal life that were present in the surrounding water when taken aboard during ballasting. These aquatic species may be native to one area or body of water but foreign to another body of water. Thus, when used ballast water is dumped or expelled, the aquatic species contained therein may not be local to the current location and so are considered an "invasive species" that can have negative effects on the surrounding ecosystem. Because of this, marine and maritime industries provide requirements and guidelines for ballast water management techniques to minimize the impact of aquatic invasive species following ballast exchange or expulsion. The primary known methods of reducing aquatic invasive species entail performing a ballast water exchange, either in designated facilities that treat the used ballast water after removing it from the tank, or in open water/ocean where the invasive species will represent a smaller ratio of the surrounding ecosystem and therefore have less of an impact.

The problem of aquatic invasive species is not limited to industrial or commercial vessels or seagoing vessels. For instance, recreational, private and watersport boats used on lakes and waterways also use ballast tanks or bags for balance and stability. The lake water also carries marine life that can be considered invasive species in other locations. For instance, since 2009 the Water Sports Industry Association (WSIA) has acknowledged the problem of aquatic invasive species such as mussels, and particularly Zebra and Quagga mussels that proliferate once introduced. The mussels may be drawn into ballast water as either adults or larvae and once introduced into a new environment will proliferate quickly, infiltrating power plants or irrigation pipes and restricting water flow through these pipes. This impacts not only industry but also recreational enjoyment of lakes and waterways.

Given the pervasiveness of the issue, decontamination stations exist at docks, marinas and ports to remove and decontaminate ballast water, as well as decontaminate the ballast tanks, of boats and ships upon their return. Decontamination is achieved a number of ways, such as but not limited to the use of heat, UV light, vibration, sound and chemicals and combinations thereof. Inspection stations then confirm the ballast tanks are decontaminated before the boat or ship is permitted to launch again. However, the decontamination process performed by such stations is a time-consuming process, depending on the number and size of ballast tanks onboard, volume of ballast water to be treated, number of boats in queue to be treated, and number of stations available to perform the treatment. Typical decontamination processes at such dedicated stations can take hours per boat. Since this is a required step between trips, it can delay launches and negatively impact or frustrate the use and enjoyment of a boat.

Attempts have thus been made to manage or remove aquatic invasive species from ballast water while onboard a boat or ship, to avoid the use of decontamination stations on land. For instance, U.S. Patent Publication Number 2016/0318593 discloses a system in larger ships where one tank may be emptied into a larger treatment tank onboard for processing to kill microorganism, such as by heat, UV light, vibration, sound, chemicals and/or inert gas to induce oxygen deprivation. Because of its effectiveness, heat is frequently used. For example, Japanese Patent Number JP2794537 discloses a heat treatment system to kill pests such as bacteria and plankton inhabiting the ballast(s) of a ship by injecting heated water into the ballast tank(s) toward the inner wall which kills the pests in the tank upon injection. The heated water used for this process is engine cooling water that has been heated in the process of cooling the engine.

Other references also disclose recycling heat from the engine to use in the heat treatment of ballast tanks. For instance, U.S. Patent Publication Number 2007/0221362 discloses a system for disinfecting fluid, such as ballast water in ships, by heating the fluid with a heat exchanger using waste heat from other sources in the ship, such as the engine, to kill microorganisms in the fluid as the ship travels between ports. WO2019/134961 discloses a heat treatment system that can be used during a voyage to heat ballast water and kill microorganisms, rather than having to wait until in port for processing. Heating the ballast water may be accomplished during ballasting, de-ballasting or circulating the fluid between ballast tanks. It also discloses using surplus heat from the propelling the vessel, such as from the main engine jacket cooling water or exhaust heat, to provide the heat for sterilization. This heat may be transferred to the heat treatment system by a heat exchanger. Finally, U.S. Pat. No. 10,246,174 discloses a heat-exchange system for use on an engine-powered watercraft that includes a first liquid cooling system for cooling the engine and a second water heating system for heating water onboard the vessel. Each system uses a heat exchanger. A portion of heated coolant from the engine cooling system is directed to the second heat exchanger where the heat from the coolant is transferred to water to heat the water to temperatures of at least 140° F. This heated water may be flushed through other passages onboard that are exposed to raw water during operation to kill aquatic invasive species therein, including the ballast system having a ballast pump and multiple ballast bags.

However, these previous onboard treatment systems still suffer from shortcomings. For instance, they focus on the temperature of the engine rather than the ballast tanks. There is no indication in these previous systems that the ballast water present in the tanks is actually decontaminated of invasive species. There is also no way to demonstrate successful decontamination to inspection stations at the dock or port.

There is still room for improvement, particularly with respect to ways in which to track and verify successful decontamination.

SUMMARY

A system and methods for heat treatment of ballast fluid are disclosed herein which monitor the status of the ballast tanks, rather than other parts of the boat, to verify decontamination is occurring and is achieved. The system is adaptable for selective use on the water while underway, using the heat generated by the engine for decontamination, or on land such as when the boat is trailered for convenient decontamination at a dry slip or at home with the use of an external auxiliary heat source connected to the boat. The system may be integrated with the boat's onboard electronics, which may control the decontamination process and provide logs or history reports to a user and/or the inspection station upon request to confirm successful decontamination, regardless of whether water or land mode was employed.

This invention therefore provides a number of benefits, including that the boat can be decontaminated anywhere and by anyone, not just specialized facilities. It can also be performed at any time, before or after ballast water exchange, in the water or on land for maximum flexibility and convenience. It therefore allows boat owners and operators to perform their own ballast tank decontamination on their own schedule, thus avoiding the need to wait for decontamination stations. Importantly, it also provides verification to the boat operator and inspection station that the ballast tanks or bags have been decontaminated, thus meeting industry regulations and requirements.

The system includes at least one ballast tank or bag having an input valve and output valve. The ballast tank or bag holds the ballast fluid and the corresponding input and output valves may be opened or closed to allow the ballast fluid to flow into and out of the tank for circulation through the rest of the system. The system also includes a heat source in fluid flow communication with the output valve and which receives ballast fluid from the ballast tank. The heat source transfers heat to the ballast fluid while it is resident therein, even when in motion passing through the heat source. The heat source is also in fluid flow communication with the input valve of the ballast tank so the heated ballast fluid may be returned to the ballast tank. A pump is in fluid flow communication with the ballast fluid when the input and output valves are open. The pump circulates the ballast fluid iteratively in a circuit from the ballast tank(s) to the heat source for heating, then back to the ballast tank(s), and repeats the cycle until decontamination by heat treatment is complete.

The heat source may be an onboard heat exchanger which utilizes engine coolant heated from the engine cooling system of the boat, or it may be an auxiliary heat source external to and connected to the boat such as at the fill point. The onboard heat source may be used in a water mode to heat treat ballast fluid while underway on the water, and the auxiliary heat source may be used to heat treat the ballast fluid in a land or trailered mode.

The system also includes diverter valves upstream and downstream of the heat source in the circuit. These diverter valves are selectively moved from a first position directing the fluid flow to and from the onboard heat source, and a second position directing fluid flow to and from the auxiliary heat source. Therefore, the system can be selectively operated in water or land mode as desired, with the diverter valves providing circuit configuration accordingly.

The system also includes a temperature sensor in each ballast tank providing information on the temperature of the ballast fluid. A single pass of the ballast fluid through the system, and specifically through the heat source, is usually not enough to sufficiently heat the fluid to kill invasive species therein. The system therefore recirculates the ballast fluid in multiple passes through the circuit, with the temperature sensor in the ballast tank continually tracking the temperature of the ballast fluid. When the ballast fluid present in the tank reaches a predetermined temperature condition, such as 105° F. for 5 minutes or 140° F. for at least 10 seconds, the input and output valves are closed and the pump is powered down. The system therefore contemplates multiple passes for heating and feedback from the ballast tanks to determine when decontamination is achieved.

Most boats or marine vessels with ballast tanks or bags contain more than one ballast tank/bag. The present invention can heat treat all ballast tanks or bags onboard, either simultaneously or one at a time. If treating all at once, the input and output valves for each ballast tank are opened at the same time to allow the pump to access ballast fluid from all tanks at the same time. Alternatively, individual tanks may be accessed by opening only the input and output valves of the selected ballast tank while the others remain closed. Combinations of certain ones of the ballast tanks may be treated at the same time while others remain closed. Once a ballast tank has achieved sterilizing temperature conditions, its input and output valves are closed to remove the ballast tank from the circuit while any remaining connected tanks continue to be treated until they each reach sterilizing temperature conditions. In this manner, the ballast tanks may be treated together, independently, or in any combination thereof, and for as long as is needed to decontaminate each tank according to information specific to that tank. This is particularly beneficial since each ballast tank or bag may have a different volume of fluid at a different starting temperature from other ballast tanks or bags. Regardless of starting conditions, the present system is capable of heat treating each ballast tank or bag as needed to ensure decontamination.

The entire system is preferably integrated with and controlled by a control unit of the boat. This is the onboard computer for the boat directing all electronics for the vessel. The control unit is in electronic communication with the sensors, valves and pump of the system to receive information from each and direct the opening and closing of valves, activating and deactivating of the pump and operative parameters of the pump and optionally the heat source according to the ballast fluid temperature information received from the temperature sensor in the ballast tank. In water mode, the control unit is also in communication with the engine temperature sensor and tachometer to receive information on engine temperature and speed. Decontamination may only be started in water mode when the engine is generating enough heat to support heating the ballast fluid. This is demonstrated when the sensor information shows the engine is running, such as at least 0 rpm, and the engine temperature meets a predetermined engine temperature threshold, such as 110° F. or 150° F. Otherwise, there may not be sufficient heat to fully treat the ballast fluid. When an auxiliary heat source is connected to the boat, the control unit receives a signal of this connection and overrides the onboard heat source. Therefore, in land/trailer mode the engine speed and temperature are irrelevant and the onboard heat source is bypassed with the diverter valves.

The system also includes a display in electronic communication with the control unit which presents information on the contamination or decontamination status of each ballast tank to the boat operator or user. The display is interactive to allow the user to select particular ballast tank(s) for decontamination, and to fill or drain selected ballast tank(s).

These selections are conveyed to the control unit for operation of the system accordingly.

Regardless of water or land mode, the control unit also tracks the information received and actions taken by the system and provides a log or history report of decontamination events to verify and confirm the decontamination status of the ballast tanks. Because it is in communication with the engine, the control unit can also confirm that the engine has not been started, that the heat treatment circulation pump, and individual ballast pumps, inlet and outlet valves have not been operated or opened since the last time a decontamination protocol was performed with the present system, confirming decontamination status remains intact. This history report can be stored in the control unit's memory for later recall, such as to inspection station personnel.

The ballast fluid heat treatment system and method of the present invention, together with their particular features and advantages, will become more apparent from the following detailed description and with reference to the appended drawings.

DESCRIPTION OF THE DRAWINGS

Like reference numerals refer to like parts throughout the several views of the drawings.

DETAILED DESCRIPTION

As shown in the accompanying drawings, the present invention is directed to a heat treatment system which can be selectively configured to decontaminate fluid from ballast tanks or bags while underway on the water or on land when trailered. As used herein, the terms "heat treatment" and "decontaminate" or "decontamination" may be used interchangeably and refer to using heat to kill, render inert or biologically inactivate aquatic invasive species. "Aquatic invasive species" means marine plant or animals which may cause deleterious effects in non-native environments, such as but not limited to mussels, including Zebra and Quagga mussels. "Ballast fluid" refers to the water as well as any particulates, living organisms and aquatic invasive species which may be onboarded with the water during ballasting and therefore resident in the ballast tank. "Water mode" refers to the system configuration used when the boat or vessel is at least partially submerged in water. "Land mode," "trailer mode" or "Land/trailer mode" refers to the system configuration used when the boat or vessel is out of the water and/or on land, which may include when the boat or vessel is on a trailer or in a dry slip. The term "user" refers to the operator of the system and/or boat or vessel.

System

Figure 1:
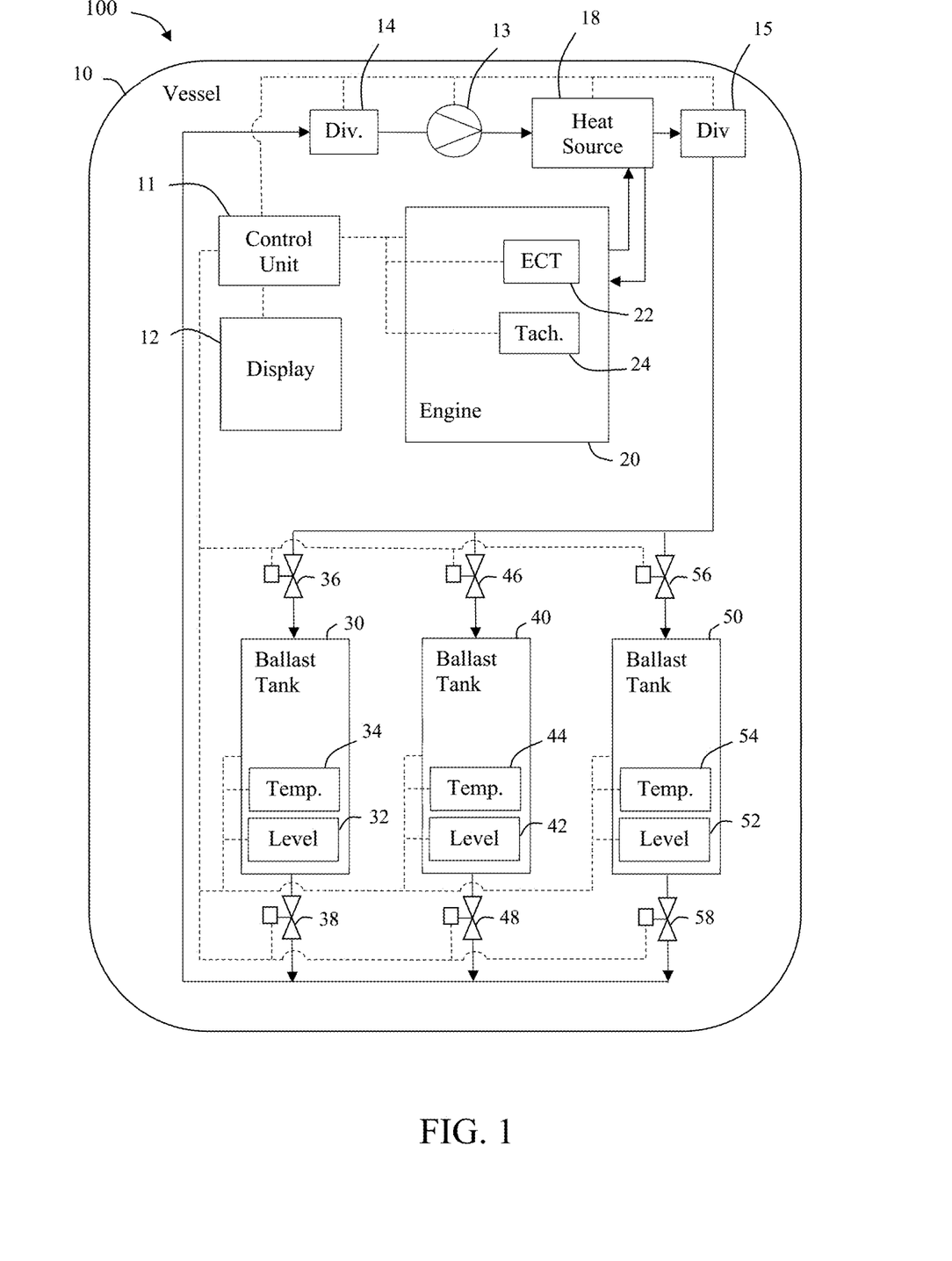
FIG. 1 is a schematic diagram of a first configuration of the heat treatment system of the present invention, for use in water mode during operation of the vessel on water.
Figure 2:
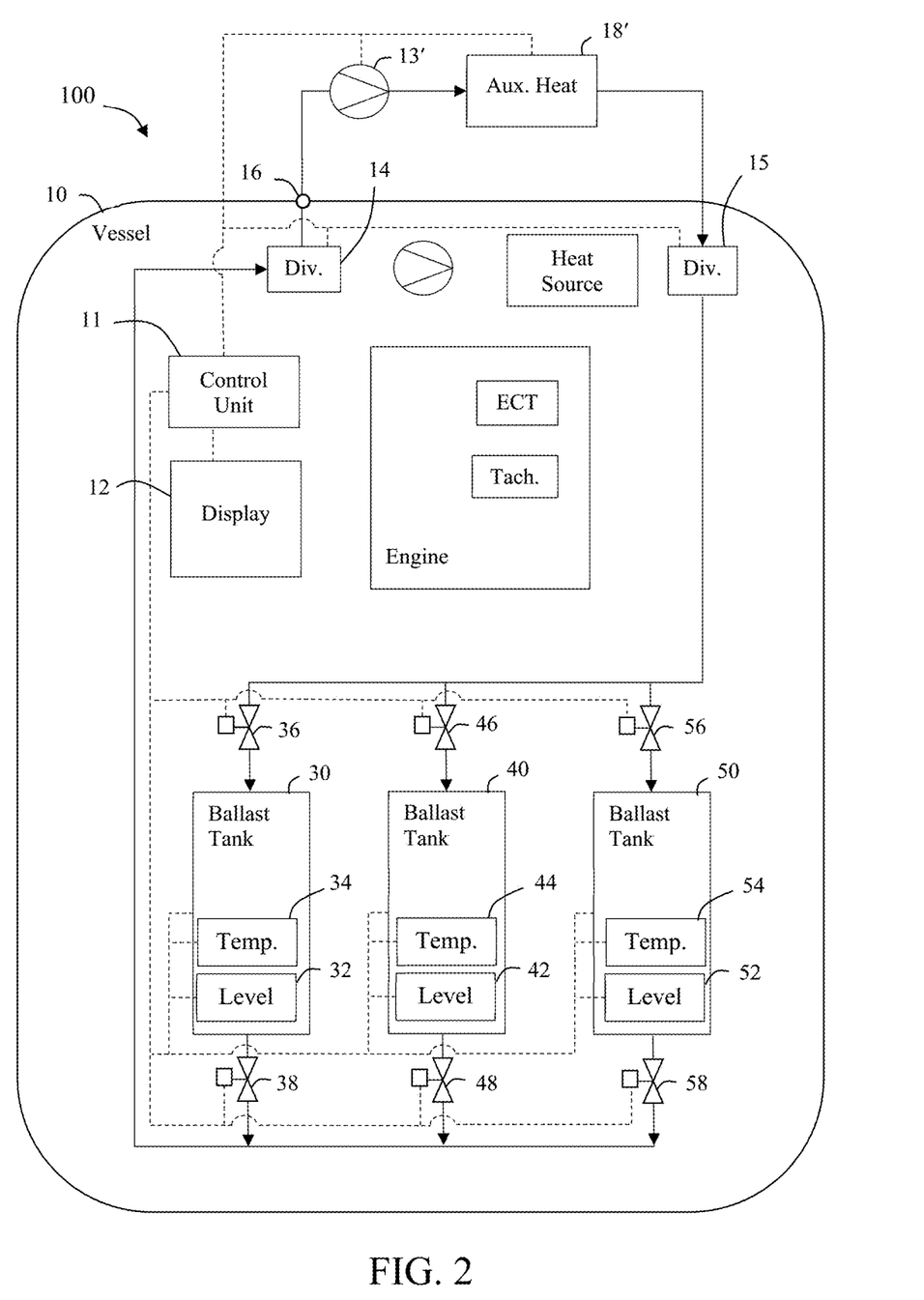
FIG. 2 is a schematic diagram of a second configuration of the heat treatment system of the present invention, for use on land in trailer mode.

The heat treatment system 100 of the present invention may be selectively configured in a first configuration for water mode or use, as shown in FIG. 1, and a second configuration for land mode or use, as shown in FIG. 2, depending on how the user chooses to use the system. It is the same heat treatment system 100 which can be used in different ways depending on the circumstances of the decontamination—either on the water or on land.

The heat treatment system 100 is implemented on a vessel 10, which may be any marine vessel or watercraft, such as but not limited to boats, having at least one ballast tank. The vessel 10 may be recreational, commercial or industrial in nature and may be an inboard or outboard boat of any length, size or engine power. In at least one embodiment, the vessel 10 may be an inboard wakeboard towboat. As shown in FIGS. 1 and 2, the vessel 10 has at least one, though preferably a plurality of ballast tanks. Though referred to as "tanks," the ballast tanks may be ballast bags. There may be any number of ballast tanks present in the vessel 10 and included in the heat treatment system 100. For instance, the vessel 10 may include a first ballast tank 30, a second ballast tank 40, and so on up to an $n^{th}$ ballast tank 50. The ballast tanks 30, 40, 50 hold ballast fluid, such as water from the surrounding body of water in which the vessel 10 is submerged, for providing weight and balancing the vessel 10. The ballast tanks 30, 40, 50 may be any size, shape, dimension, number and location throughout the vessel as required for a particular vessel 10. For example, the ballast tanks 30, 40, 50 may each be in the range of 400 to 1200 pounds, or may have a holding capacity in the range of 20 to 150 gallons. Further, the ballast tanks 30, 40, 50 may be the same size as one another or different sizes. For instance, in at least one embodiment the second ballast tank 40 may be larger than the other ballast tanks and centrally located in the vessel to provide weight, stability and lower the center of gravity of the vessel 10. The remaining ballast tanks 30, 50 may be smaller and peripherally located in the vessel 10 for additional stability. The ballast tanks 30, 40, 50 may be filled during ballasting and emptied during de-ballasting as is commonly understood. For instance, each ballast tank 30, 40, 50 may have its own dedicated pump (not shown) to fill the tank from surrounding water. In other embodiments, the ballast tanks 30, 40, 50 may be filled through forced induction when the vessel 10 is underway.

Each ballast tank 30, 40, 50 also includes its own volumetric indicator 32, 42, 52, respectively, retained within, on or otherwise associated with the corresponding ballast tank 30, 40, 50. The volumetric indicators 32, 42, 52 detect or determine the level of fluid within the corresponding ballast tank 30, 40, 50, also referred to herein as the volume information. This volume information may be reported in terms of volume or percentage of the total capacity of the ballast tank 30, 40, 50. For instance, in at least one embodiment the volumetric indicators 32, 42, 52 may be a timer associated with a fill valve or dedicated ballast pump used in filling the ballast tank 30, 40, 50 with fluid. In such embodiments, the flow rate of the associated ballast pump or fluid intake, such as through induction, is known and/or pre-programmed or configured into the timer and may be used to indicate the volume of fluid that has entered the ballast tank 30, 40, 50. For instance, if a ballast pump has a flow rate of 10 gallons per minute and the ballast timer reports the ballast pump runs for 5 minutes, then it is determined that there is 50 gallons of ballast fluid in the ballast tank 30, 40, 50. This is one illustrative example and is not intended to be limiting. The volume determination may be performed by a control unit 11, discussed in greater detail below, or by the ballast timer itself. In other embodiments, the volumetric indicator 32, 42, 52 may directly measure the volume of fluid. In such embodiments, the volumetric indicators 32, 42, 52 may be mounted within the respective ballast tank 30, 40, 50, such as side mounted to the wall of the tank, or may be freely retained within the interior volume of the ballast tank 30, 40, 50, so as to float and rise and fall with the fluid contained therein.

Each ballast tank 30, 40, 50 also includes a temperature sensor 34, 44, 54 capable of detecting the temperature of the fluid inside the ballast tank 30, 40, 50, also referred to herein as ballast fluid temperature information. The temperature may be detected and reported in degrees Fahrenheit, Celsius or other temperature scale and may optionally be selectively configured for the relevant scale. The temperature sensors 34, 44, 54 may be located within each respective ballast tank 30, 40, 50 or at openings thereof. In one embodiment, the temperature sensors 34, 44, 54 may be mounted to the wall of the corresponding ballast tank 30, 40, 50. In other embodiments, the temperature sensors 34, 44, 54 may be retained within, but not affixed or attached to, the ballast tank 30, 40, 50, such that the temperature sensors 34, 44, 54 may float within or be suspended in the fluid stored in the tank.

The system 100 also includes an input valve and output valve associated with each ballast tank 30, 40, 50. For instance, there is a first input valve 36 and first output valve 38 in fluid communication with first ballast tank 30; a second input valve 46 and second output valve 48 in fluid communication with the second ballast tank 40; and an $n^{th}$ input valve 56 and $n^{th}$ output valve 58 in fluid communication with the $n^{th}$ ballast tank 58, as shown in FIG. 1. Each input valve 36, 46, 56 is located upstream of its respective corresponding ballast tank 30, 40, 50 in the flow path of fluid through the system 100 and provide fluid into the ballast tank 30, 40, 50. Each output valve 38, 48, 58 is located downstream of its respective corresponding ballast tank 30, 40, 50 in the flow path of fluid through the system 100 and provide fluid egress out from the ballast tank 30, 40, 50. The input and output valves 36, 46, 56, 38, 48, 58 may be any suitable valve, such as but not limited to a gate valve, globe valve, check valve, plug valve, ball valve, butterfly valve, piston valve, and solenoid valve. In at least one embodiment, the input and output valves 36, 46, 56, 38, 48, 58 are solenoid valves that are electrically operated and controlled and may be controlled in a coordinated fashion with one another or independently. For instance, the first input and output valves 36, 38 may be controlled in coordination together to vary the flow of fluid into and out of the first ballast tank 30; the second input and output valves 46, 48 may be controlled in coordination to vary the flow of fluid into and out of the second ballast tank 40; and the $n^{th}$ input and output valves 56, 58 may be controlled in coordination to vary the flow of fluid into and out of the $n^{th}$ ballast tank 50. The input and output valves 36, 46, 56, 38, 48, 58 may be selectively or independently operated in any grouping or collection as may be desired, as described below.

The heat treatment system 100 also includes a pump 13 in fluid communication with the output valves 38, 48, 58 of the ballast tanks 30, 40, 50. The pump 13 moves the ballast fluid through the system for heating and decontamination. The pump 13 therefore has sufficient capabilities to move the amount of ballast water contained within the ballast tanks 30, 40, 50 at sufficient rates to allow for heating of the ballast fluid and return to the tanks 30, 40, 50, as described below. For instance, in one embodiment the pump 13 may have 0.18 horsepower and be able to move fluid at a flow rate in the range of 5 to 40 gallons per minute (gpm), such as but not limited to the JABSCO® Ballast Puppy ballast pump. In certain embodiments, the pump 13 may move fluid at flow rates of 10, 15, or 20 gpm. The pump 13 is preferably electrically controlled, such as described in greater detail below.

In a first configuration of the heat treatment system 100 for use on the water, shown in FIG. 1, the pump 13 may be located onboard the vessel 10 and may preferably be integrated within the system 100. In a second configuration of the heat treatment system 100 for land or trailered use, shown in FIG. 2, the pump 13' may be outside the vessel 10 and separate therefrom. The pump 13' may therefore be selectively connected to the vessel 10 both physically and electronically, such as at the fill point 16, to provide access to the ballast fluid when the vessel 10 is on land, such as when loaded on a trailer. The pump 13' used in the second land configuration may be the same or similar type as the pump 13 used in the first water configuration, or it may be different but may have similar power rating and/or flow rate capabilities. For instance, the pump 13' used in the land configuration may be able to provide more power than one used onboard in the water configuration since the land-used pump 13' may use an outlet connection as a power source and is therefore not limited to the battery capacity of the vessel for power as the onboard pump 13 is. In at least one embodiment, the pump 13' may be a FLOTEC® Centrifugal Water Pump having ¾ horsepower and 2,580 gallons per hour flow rate capabilities. This is but one non-limiting example. In other embodiments, the pump 13' need not be a centrifugal pump but may be any suitable type of pump.

The heat treatment system 100 also includes a heat source 18 which provides the heat to raise the temperature of the ballast fluid sufficiently to kill the aquatic invasive species contained therein. The heat source 18 is in fluid communication with the pump 13 and receives the ballast fluid from the pump 13. The heat source 18 heats the ballast fluid while it is resident within and/or moving through the heat source 18. The heat source 18 is also in fluid communication with the input valves 36, 46, 56 of the ballast tanks 30, 40, 50 so that heated ballast fluid exiting from the heat source 18 is conveyed to the input valves 36, 46, 56 and thus back into the ballast tanks 30, 40, 50 once heated. The pump 13 moves the ballast fluid through the entire system, and thus also through the heat source 18.

In the first configuration of the system 100 used on water, shown in FIG. 1, the heat source 18 may be an onboard heat source 18, such as a heat exchanger which utilizes the heat from the engine 20 to heat the ballast fluid. For instance, in at least one embodiment, raw water may be drawn into the engine from the surrounding water; circulated through the engine block, head and manifold in a water jacket where it absorbs heat from the warmer engine; then circulates through an engine heat exchanger (not shown) where it passes this heat along to engine coolant. The now-heated engine coolant is then conveyed to the onboard heat source 18, a second heat exchanger, where it passes adjacent to piping carrying the ballast fluid. Being of lower temperature, the ballast fluid being pumped through the onboard heat source 18 absorbs the heat from the engine coolant, raising the temperature of the ballast fluid. Thus, ballast fluid exiting the heat source 18 has a higher temperature compared to when it entered the heat source 18, and engine coolant exiting the onboard heat source 18 has a lower temperature than when it entered the heat source 18. The engine coolant leaving the onboard heat source 18 is returned to the engine 20 where it is once again heated by the engine water jacket.

The onboard heat source 18 may have various parameters which affect the rate of heating. For instance, in at least one embodiment the heat source 18 may be a heat exchanger, such as a shell and tube heat exchanger having a shell diameter in the range of 2 to 10 inches, preferably about 4 inches, and providing at least 1 pass of the tube through the shell, preferably 2 or 4 passes, though more passes are also contemplated for added heat transfer. The flow rate of the ballast fluid through the tube of the heat exchanger may be the same or different from the flow rate of engine coolant through the shell of the heat exchanger, and either flow rate may be higher or lower than the other depending on operative parameters. The flow rates depend on a variety of factors including but not limited to pump speed, fluid volume, and diameter of the tube or shell, respectively. For instance, in at least one embodiment, the heat exchanger may allow flow rates of the ballast fluid in a range of about 5 to 20 gpm, preferably at about 14 gallons per minute (gpm), and of the engine coolant in a range of about 2 to 15 gpm, preferably at about 10 gpm.

In other embodiments, the heat source 18 may itself be the engine water jacket (not shown), such as in vessels 10 lacking a closed cooling system and relying solely on raw water for engine cooling. In such embodiments, the heated water in the water jacket provides the heat that transfers to the ballast fluid, rather than coolant.

The engine 20 includes an engine temperature sensor 22 in communication with fluid responsible for cooling the engine. For instance, in some embodiments the engine temperature sensor 22 may be an engine coolant temperature (ECT) sensor in the fluid flow path of the heated engine coolant leaving the engine on the way to the heat source 18. In other embodiments, the engine temperature sensor 22 may be in the fluid flow of the raw water circulating in the engine water jacket. Regardless, the engine temperature sensor 22 detects the temperature of the engine, such as but not limited to by electrical resistance, and indicates when the engine is producing enough heat to warm the ballast fluid. The engine 20 also includes a tachometer 24 which detects the speed of the engine in revolutions per minute (rpm).

In the second configuration of the system 100 used on land or trailered, shown in FIG. 2, the heat source 18' may be an auxiliary heat source that is external to the vessel 10. For instance, the auxiliary heat source 18' may be an on-demand hot water heater, such as but not limited to an electric or gas-fueled hot water heater having a power rating of about 4500 W and capable of producing up to 160° F. for 2 hours, as but one example. These are just illustrative examples and are not intended to be limiting. Regardless of type, the auxiliary heat source 18' is external to the vessel 10 and is selectively attached or connected thereto while it is out of the water, such as when it is trailered on land, which may include in a dry slip at the marina or at the owner's home. The auxiliary heat source 18' may connect physically, and in some embodiments electronically, to the vessel 10. In some embodiments it may connect to the vessel 10 through the fill point 16, as shown in FIG. 2. In other embodiments, the auxiliary heat source 18' may connect to the vessel 10 through other suitable connection points, such as but not limited to the ballast tanks 30, 40, 50 directly.

The heat treatment system 100 also includes at least one, though preferably a plurality of diverter valves to direct the flow of ballast fluid to the appropriate heat source. For instance, as shown in FIGS. 1 and 2, the system 100 includes a first diverter valve 14 upstream of the heat source 18, 18' and a second diverter valve 15 downstream of the heat source 18, 18'. The diverter valves 14, 15 may be the same type or different type of valve as one another and may be the same or different type as the input and output valves 36, 46, 56, 38, 48, 58 associated with the ballast tanks 30, 40, 50. In at least one embodiment, the first and second diverter valves 14, 15 are three-way solenoid valves that permit selective direction of fluid flow in two directions. In the first configuration for water use, shown in FIG. 1, the first and second diverter valves 14, 15 are configured to direct fluid flow to and from the onboard heat source 18 when opened. In the second configuration for land/trailered use, shown in FIG. 2, the first and second diverter valves 14, 15 are configured to direct fluid flow to and from the auxilliary heat source 18' when opened, bypassing the onboard heat source 18. In at least one embodiment, the diverter valves 14, 15 may be upstream of the pump 13, 13', as shown in FIGS. 1 and 2, though in other embodiments the diverter valves 14, 15 may be downstream of the pump 13, 13'.

In at least one embodiment, the heat treatment system 100 also includes a control unit 11 which is the computer of the vessel 10. The control unit 11 provides electronic controls for the entire vessel 10. In at least one embodiment, the control unit 11 may be a controller area network (CAN) bus system networking various independent controllers together, which may allow synchronous communication and transmission of information. In at least one preferred embodiment, the control unit 11 may be a power distribution module (PDM) connecting to a CAN bus system and may provide solid state switches for controlling the various modules attached thereto capable of managing high-current loads. For instance, in at least one embodiment, the control unit 11 may be a PDM such as that manufactured by Enovation Controls (Tulsa, Oklahoma) providing 15 amps per channel. The control unit 11 may include a plurality of PDMs in electronic communication with one another to provide as many input/outputs (I/O) as necessary to address the electronic needs of the vessel 10. These PDMs may be on the same CAN bus and collectively form the electronic control of the vessel 10. In still other embodiments, the control unit 11 may simply be a collection of fuses, switches, relays and I/Os collectively networking the various electronic components of the vessel 10 together.

As shown in FIGS. 1 and 2, the control unit 11 is in electrical communication with every other component of the heat treatment system 100, including all the sensors, valves and pumps discussed above. The control unit 11 is also in electronic communication with the engine 20, engine temperature sensor 22 and tachometer 24 of the vessel 10. The control unit 11 is therefore capable of sending and receiving signals to and from each component of the system 100 and may permit synchronous transmission of information among the various components. The valves discussed above are all preferably electronically controlled valves, such as solenoid valves, which permit the control unit 11 to direct the opening and closing of the valves to direct the flow of ballast fluid through the system 100. Similarly, the pumps 13, 13' and heat sources 18, 18' may be controlled by the control unit 11, with the external pump 13' and heat source 18' being electronically accessed such as but not limited to through the fill point 16. The valves and pumps directing the flow of cooling water through the engine water jacket, the coolant through the engine heat exchanger and the coolant through the onboard heat source 18 may also be controlled electronically through the control unit 11.

Figure 5:
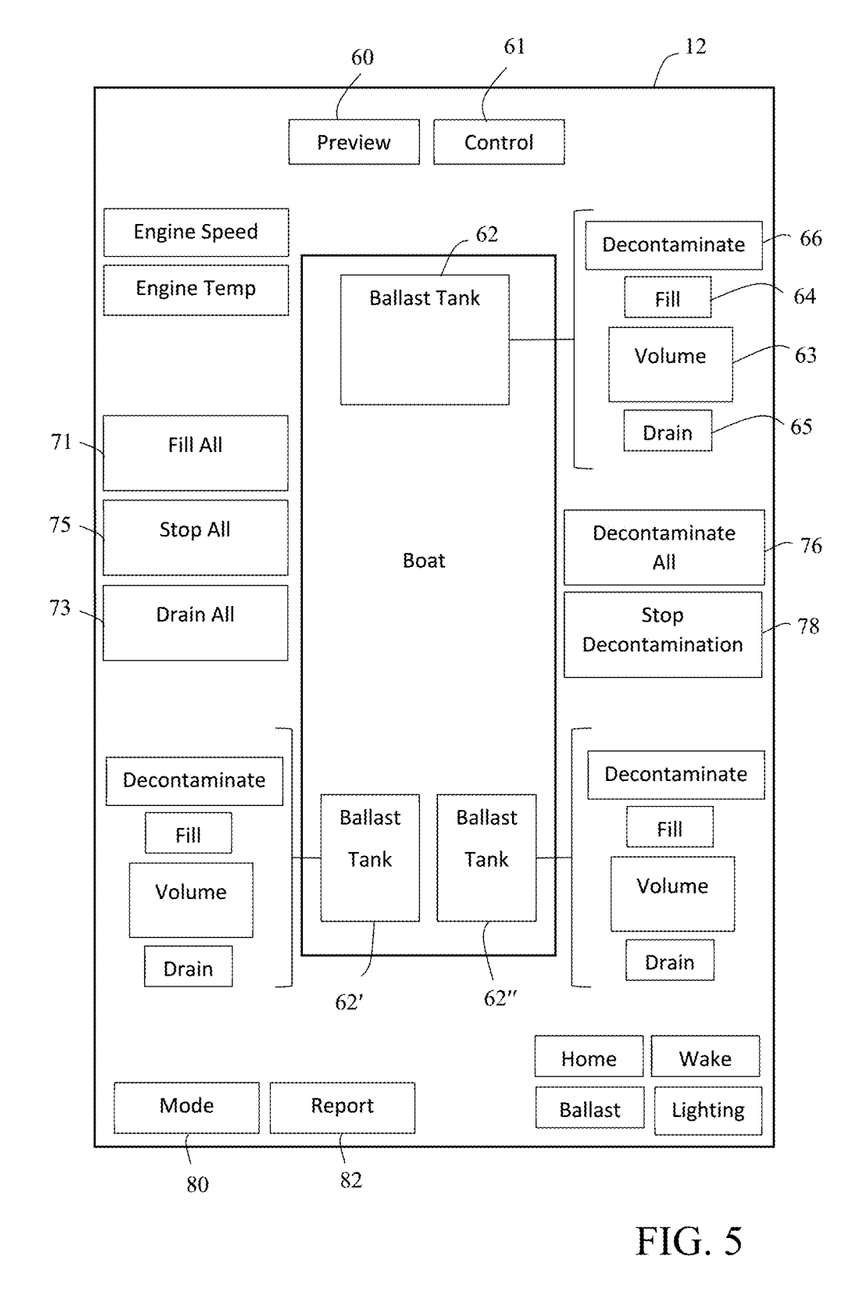
FIG. 5 is a schematic diagram of an exemplary display of a watercraft showing the interactive features and control of the heat treatment system and method.

The heat treatment system 100 also includes a display 12 in electrical communication with the control unit 11. The display 12 includes a graphical user interface (GUI) through which information from the control unit 11 is presented to a user for interactive viewing and control. The display 12 may therefore be present in the dashboard at the helm of the vessel 10. It may include a touchscreen, buttons, joystick, keyboard, mouse or other suitable mechanisms of making selections and inputting directions to the system 100 by a user. The display 12 may present information to the user through a variety of screens which provide information on the state of the vessel 10, its components, the heat treatment system 100 and its components, including the contamination and/or decontamination status of the ballast tanks 30, 40, 50, such as shown in FIG. 5. Information specific to the ballast tanks and their contamination or decontamination state may be viewed by selecting a Preview 60 button on the display 12.

User interaction with the display 12 may direct what information is currently being viewed by the user and the actions taken by the control unit 11 with respect to the heat treatment system 100. For instance, and with reference to FIG. 5, the user may select Preview 60 to view the current status of the vessel 10 and ballast tanks 30, 40, 50 in summary form. For instance, the ballast tanks 30, 40, 50 may be depicted graphically on the display 12 as ballast tank icons 62, 62', 62", and may appear with different indicia to show their status, such as different colors or labels for whether they are contaminated or decontaminated. Each ballast tank icon 62, 62', 62" may have associated with it certain icons, such as a Volume icon 63 showing the volume of the ballast fluid present in the corresponding tank or percentage of total capacity of the tank it currently has. For the purpose of ballast tank status determination, "decontaminated" means having been subjected to a heat treatment method 200, 200' as described below and it being confirmed that the engine 20 has not been turned on or the pumps 13, 13' have not been activated since the method 200, 200' was last performed. "Contaminated" as used herein means the engine 20 has been turned on or the pumps 13, 13' have been activated since the last time a decontamination protocol of the present method 200, 200' was performed, or if a decontamination protocol of the present method 200, 200' has not been performed since the ballast tank 30, 40, 50 was last filled. For instance, a ballast tank icon 62 may be represented on the display 12 in a certain color such as black or red, or with a "contaminated" label when contaminated, and in a certain different color such as green or with a "decontaminated" or "clear" label when decontaminated.

A Control icon 61 may be selected on the display 12 to reveal input options for instructing the filling and/or decontamination of ballast tanks 30, 40, 50 when action is desired. The control view is shown in FIG. 5. For instance, the icons for the ballast tanks may appear as they did in the preview view, but with options to select individual icons, such as by tapping corresponding Decontaminate icons 66, to select them for decontamination. Any or all of the ballast tanks may be selected in any combination. Alternatively, there may be a "Decontaminate All" icon 76 to select which would automatically select all ballast tanks for decontamination. The appropriate decontamination method 200, 200' as described below, may begin for a particular ballast tank once its icon is selected on the display 12. Alternatively, various ballast tanks may be selected and held in queue for decontamination protocol on the selected ballast tanks. If multiple ballast tanks are selected but are to be treated one at a time, they may be held in queue and treated in the order of selection or according to preprogrammed orders of priority. The display 12 may also show a status indicator, such as a bar, graph, chart, or graphical representation of the status of the decontamination method, which may update in real-time as the treatment progresses.

There may also be additional icons to control adding and removing fluid from the ballast tanks. For instance, each ballast tank icon 62 may have an associated Fill icon 64 which can be selected to bring in additional fluid to the corresponding ballast tank, and a Drain icon 65 which can be selected to remove ballast fluid from the corresponding tank. The display 12 may also include a Fill All icon 71, Drain All icon 73 and Stop All icon 75 directing the addition and removal of fluid from all ballast tanks at the same time. Filling ballast tanks and heat treating the ballast fluid according to the methods provided herein are separate and independent processes, but they can be performed at the same time or at different times.

A Mode icon 80 may show the current configuration status of the system 100 and/or method 200, 200' which is being employed for decontamination, such as the first configuration (water mode) or second configuration (land or trailer mode). For instance, FIG. 5 shows the system and method in Trailer Mode, indicating an auxiliary power source 18' is connected to the vessel 10. When in the first configuration, this Mode icon 80 will show Water Mode. The control view may also provide a Report icon 82 which can be selected to bring up the decontamination history, report or logs, either on the display 12 and/or to push it to the inspection station for review.

Methods

The present invention also includes methods of heat-treating ballast fluid for both water use and land/trailer use. These methods may also be referred to herein as "heat treatment methods," "decontamination methods," and "decontamination protocols," and these terms may therefore be used interchangeably. Accordingly, "heat treatment" as used herein also refers to "decontamination" and specifically the killing, rendering inert or biologically inactivating aquatic invasive species such as but not limited to mussels, including Zebra and Quagga mussels.

Figure 3:
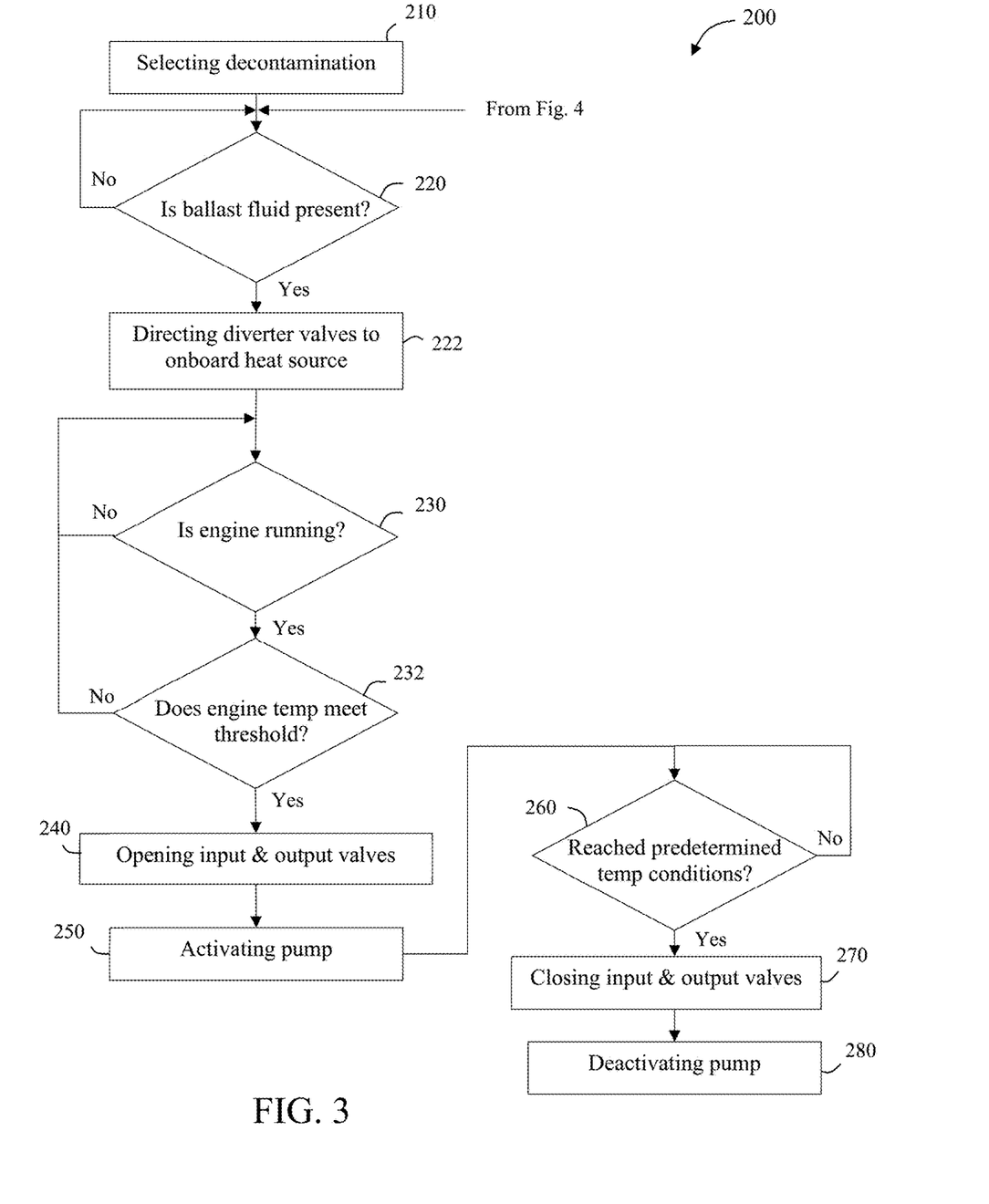
FIG. 3 is a schematic diagram of the method of decontaminating ballast water of the present invention in water mode using the heat treatment system as configured in FIG. 1.

FIG. 3 shows a method 200 of heat-treating ballast fluid to kill aquatic invasive species using the heat treatment system 100 described above in the first configuration (water mode). To begin, a user may select a decontamination protocol, as at 210. This may be accomplished by the user choosing the "Decontaminate All" function or by selecting individual ballast tanks 30, 40, 50 to decontaminate, as shown in the display screenshot of FIG. 5 for example. In at least one embodiment, the method 200 includes treating one ballast tank at a time to maintain the levels in each tank. The input from the display is transmitted to the control unit 11. Upon receiving the instruction for decontamination and selection of relevant ballast tanks to treat, the control unit 11 checks the level indicators 32, 42, 52 from the selected tanks to see whether there is fluid in the ballast tanks. There must be fluid in the ballast tanks 30, 40, 50 for decontamination to occur. In at least one embodiment, the volumetric indicators 32, 42, 52 should read ballast fluid of more than 0% of the total holding capacity of the ballast tank to proceed with decontamination. In at least one embodiment, the fluid level may be 5% or more in order for the heat treatment method 200 to continue.

Once there is confirmation that the ballast tank has at least some amount of fluid present, the method 200 continues with directing the diverter valves to the configuration to guide ballast fluid to the onboard heat source, as at 222. This is accomplished by the control unit 11 sending signals to the first and second diverter valves 14, 15 to check their position or configuration. If they are currently in a first alignment to direct fluid to and away from the onboard heat source 18 already, as shown in FIG. 1, no changes are made. If they are not in this first alignment, the control unit 11 sends operative signals to the diverter valves 14, 15 to redirect them to this first alignment. This ensures the internal or onboard circuit is adopted for heat treatment.

The control unit 11 then monitors the engine to determine when to release the ballast fluid for treatment. Specifically, the method 200 continues with checking to see if the engine is running, as at 230. To check this, the control unit 11 pings the tachometer 24 of the engine 20 for information on the speed of the engine 20. The tachometer 24 provides the engine speed to the control unit 11 in response. An engine speed greater than 0 rpm indicates the engine 20 is running. In some embodiments, a threshold engine speed may be needed to ensure the engine is operating at speeds sufficient to support the heat treatment process. In at least one embodiment, this speed is 0 rpm. In other embodiments, the engine speed threshold may be set at idle levels, such as at least 650 rpm, to ensure the engine must be in gear before heat treatment can occur, though other speeds may be set as the idle level. The particular engine speed threshold may depend on a number of factors, such as but not limited to the type of vessel, type of engine and heat generated by the engine. For example, a diesel engine may produce more heat than an electric engine. In another example, a fast idle may provide sufficient heat for the heat treatment method described herein despite not being in gear. These are a few non-limiting examples.

The method 200 also includes checking to see if the engine temperature meets a predetermined engine temperature threshold, as at 232. To check engine temperature, the control unit 11 pings the temperature sensor 22. This may provide the temperature reading for the engine coolant, in the case of an ECT sensor where coolant is used, or for the engine manifold or exhaust in the case of a water-cooled system. A minimum temperature is required to ensure the engine is providing enough heat to support the heat treatment process. In at least one embodiment, this predetermined engine temperature threshold may be at least 110° F. (or its equivalent in other temperature scales). In other embodiments, the predetermined engine temperature threshold may be at least 150° F. (or its equivalent in other temperature scales). Other temperatures may be set as the predetermined engine temperature threshold in other embodiments.

Both conditions for engine speed and temperature must be met before the heat treatment process can continue in water mode. If only one of the conditions is met, the control unit 11 will keep checking the engine sensors until both conditions are confirmed. This is to ensure the engine is hot enough to support the heat treatment process. For instance, if decontamination was attempted when the vessel 10 had only just started running, the engine temperature may not be hot enough. Similarly, if decontamination was attempted when the vessel 10 was only recently underway, the engine speed may be sufficient but it may not be hot enough yet to have accrued sufficient heat to also heat the ballast fluid. Therefore, the engine must be hot enough to start the process and be running at sufficient speeds to continue producing heat so that the decontamination process may be completed.

Once the engine is running and the predetermined engine temperature threshold is reached, the method 200 continues with opening the input and output valves, as at 240, and activating the pump, as at 250. The control unit 11 sends operative signals to the input and output valves 36, 46, 56, 38, 48, 58 of the selected ballast tank(s) 30, 40, 50 to open, permitting fluid flow into and out of the selected ballast tank(s) 30, 40, 50, respectively. In a preferred embodiment, the corresponding input and output valves 36, 46, 56, 38, 48, 58 for a selected tank may be opened the same amount or degree as one another, thus permitting an even flow of fluid through the system 100. In other embodiments, one of the input or output valves 36, 46, 56, 38, 48, 58 of a corresponding pair may be opened more or less than the other valve to control the flow of fluid. For instance, the input valve 36, 46, 56 may be opening to a greater degree than the corresponding output valve 38, 48, 58 to ensure more fluid flows into the ballast tank 30, 40, 50 than leaves it, or vice versa. In at least one embodiment, the input and output valves 36, 46, 56, 38, 48, 58 are opened from a fully closed position to a fully opened position for the heat treatment process.

The control unit 11 also sends a signal to the pump 13 to activate the pump 13 and begin pumping ballast fluid through the system. In the water mode method 200, the engine is running and the diverter valves 14, 15 are directing fluid to and from the onboard heat source 18. Therefore, the control unit 11 sends a signal to the primary pump 13 onboard the vessel 10 to activate. The primary pump 13 then begins pumping ballast fluid from the ballast tanks 30, 40, 50 through the output valves 38, 48, 58, through the system to the onboard heat source 18, back to the input valve 36, 46, 56 and into the ballast tank 30, 40, 50. The pump 13 provides flow rates as discussed above, such as in the range of 5 to 20 gpm through the system 100, and may preferably provide flow rates of about 14 gpm. In at least one embodiment, the pump 13 may be operated at a constant speed for constant flow rate. In other embodiments, however, the control unit 11 may send signals to the pump 13 to vary the speed at which it operates and thus, the flow rate of the ballast fluid through the system 100. For instance, the pump 13 may be adjusted to increase the speed and/or flow rate to get more fluid back to the ballast tanks, or it may be decreased to provide longer dwell or residence times in the heat source 18 for longer heating. The flow rate of the ballast fluid through the system 100, and specifically through the heat source 18, affects how much time the heat source 18 has to impart the heat to the ballast fluid. The amount of time needed in contact with the heat source 18, such as the number of passes through the heat source 18, will also depend on the difference in temperature between the ballast fluid and the heat source 18. For instance, when the temperature difference between the ballast fluid and the heat source 18 is great, longer retention times of the ballast fluid in the heat source 18 will transfer more heat to the ballast fluid. Over time, as the temperature of the ballast fluid rises and approaches the temperature of the heat source 18, less heat transfer occurs and retention times may not be as important.

As the pump 13 moves ballast fluid through the system 100, the control unit 11 monitors the temperature sensors 34, 44, 54 in the ballast tanks 30, 40, 50 that have been selected for decontamination. As ballast fluid returns to the tanks 30, 40, 50 from the heat source 18, the temperature of the ballast fluid retained in the tank 30, 40, 50 rises. Not all of the fluid from the ballast tank may be removed and circulated through the system 100 at the same time, and the ballast fluid may make multiple trips through the system 100. The ballast fluid is therefore treated in iterative cycles through the circuit, recirculating between the ballast tank 30, 40, 50 and the heat source 18 and increasing in temperature with each pass through the heat source 18. The control unit 11 monitors the temperature sensors 34, 44, 54 in the ballast tanks 30, 40, 50 to check if a predetermined temperature condition for the ballast fluid has been reached, as at 260, and continues monitoring until this condition is reached. The predetermined temperature condition may be a set of circumstances or events necessary to ensure aquatic invasive species in the ballast fluid have been killed and may include at least temperature and time components. The specific time and temperature combinations needed to kill aquatic invasive species and therefore decontaminate the ballast fluid are interdependent and may be inversely related. For instance, in at least one embodiment, the predetermined threshold condition may be a temperature of 105° C. for at least 5 minutes. In another embodiment, the predetermined threshold condition may be a temperature of 140° F. for at least 10 seconds.

The control unit 11 monitors the temperature sensors 34, 44, 54 in the ballast tanks 30, 40, 50 by continually receiving temperature information of the ballast fluid form the temperature sensors 34, 44, 54 as the ballast fluid circulates and recirculates between the ballast tank 30, 40, 50 and the heat source 18. As it receives ballast fluid temperature information, the control unit 11 may compare each reading received to the predetermined threshold condition preconfigured or preprogrammed in its memory to see whether the most recent reading from the temperature sensors 34, 44, 54 match the temperature component of the condition. The time component may be calculated by comparing the current temperature reading to previous temperature readings from the same temperature sensors 34, 44, 54, which may be timestamped upon receipt by the control unit 11 for such comparison purposes to determine the amount of time a given temperature sensor 34, 44, 54 has reported such temperature, and therefore indicating the amount of time the ballast fluid has been at the corresponding temperature.

Once it has been confirmed that the ballast fluid in a particular ballast tank 30, 40, 50 has reached the predetermined temperature condition of both temperature and time, the control unit 11 transmits a signal to the input and output valves 36, 46, 56, 38, 48, 58 corresponding to the particular ballast tank to close, as at 270. When multiple ballast tanks 30, 40, 50 are being decontaminated at the same time, the control unit 11 monitors the temperature sensors 34, 44, 54 of each tank as described above and directs the closing of the corresponding input and output valves 36, 46, 56, 38, 48, 58 when each tank reaches the predetermined temperature condition, indicating decontamination is complete, independent of the other tanks. Different ballast tanks 30, 40, 50 may complete decontamination at different times, depending on a number of factors such as but not limited to the temperature the ballast fluid at the beginning of the process, the volume of ballast fluid in the tank to be treated, the flow rate of ballast fluid through the system and/or heat source, and how much of the fluid from each tank was circulated through the system for heat treatment. For instance, it may take approximately 16 minutes to heat 55 gallons of ballast fluid to 140° F. using a flow rate of about 14 gpm when the ballast fluid starts at 66° F., whereas it may take about 13.5 minutes to heat the same 55 gallons of ballast fluid to 140° F. at the same flow rate when beginning at 80° F. These are just a few non-limiting examples. The control unit 11 may send instructions to close the input and output valves 36, 46, 56, 38, 48, 58 of various ballast tanks 30, 40, 50 independently of the status of other ballast tanks. Such instructions to different ballast tanks 30, 40, 50 may be transmitted concurrently if multiple ballast tanks 30, 40, 50 achieve decontamination at or about the same time.

When all ballast tanks 30, 40, 50 selected for decontamination have achieved decontamination, as indicated by the ballast temperature reaching the predetermined temperature condition, and all corresponding input and output valves 36, 46, 56, 38, 48, 58 are closed, the method 200 concludes by deactivating the pump, as at 280. In at least one embodiment, the control unit 11 may include a timer which begins when the signal to close the input and output valves is transmitted. When the timer expires, a signal is transmitted to the pump 13 to turn off or deactivate. The length of the timer may be based on the amount of time the valves require to move from an open to a closed position. In at least one embodiment, the timer may be 5 seconds, though in other embodiments the timer may last 2 seconds, 1 second, or other increments of time.

A message may then be presented on the display 12 informing the user that decontamination is complete. For instance, the graphical depiction of the selected ballast tanks on the display 12 may change from one color to another color, indicating a change from a contaminated (untreated) to a decontaminated (treated) state. A decontamination indicator, such as a label showing "Decontaminated" may appear on or near the graphical depiction of the selected ballast tanks on the display 12. The message may be an audible sound, such as a beep or chime that sounds when the heat treatment process is complete. The message may also be any other suitable indicia such as of graphical, visual, textual, video, audible, or other sensory nature.

In addition, the control unit 11 maintains a record or log of the heat treatment process, at least of the selected ballast tanks and the completion of the decontamination process for each. This history may be provided as a report for subsequent review, such as but not limited to by presentation on the display 12 of the vessel 10, or transmission to an external audit device such as may be connected to the vessel 10 at the inspection station, dock or marina by staff and may be viewed on the external audit device and/or printed therefrom. The history report or audit may include additional information as well, such as but not limited to ballast tank(s) identification information, temperatures before and after treatment, date and time stamps for the heat treatment process steps and intervals thereof throughout the process, and date and time stamps of when the engine was started and/or operated such as may be shown through engine speed and/or temperature logs. The engine information in connection with the heat treatment process information will demonstrate that the vessel has not been operated since the decontamination process, providing confirmation that the treated ballast fluid remains decontaminated. This information may be useful or even necessary before the vessel is permitted to launch again, particularly if the marina or dock crew do not perform treatment on the ballast fluid themselves.

Figure 4:
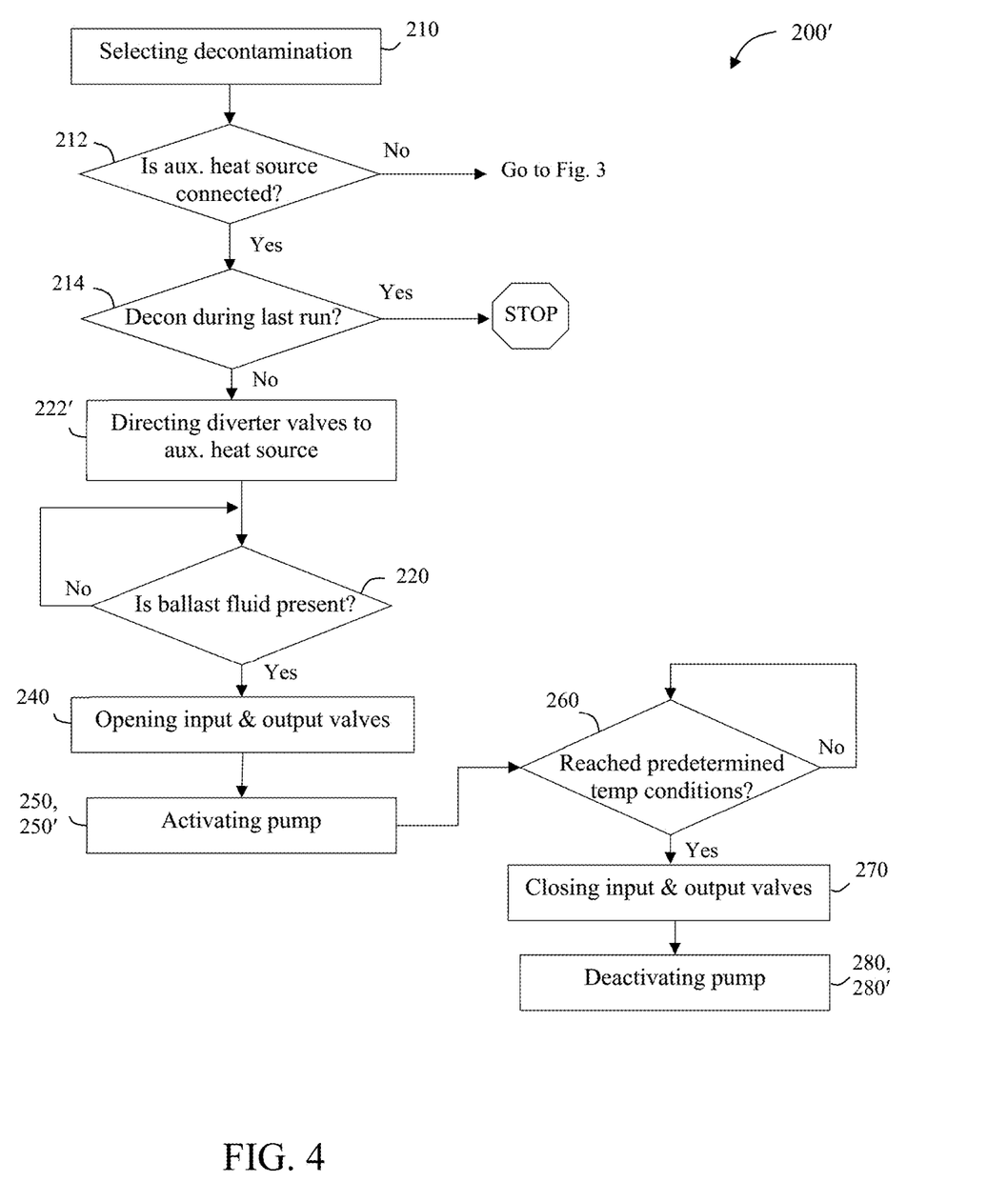
FIG. 4 is a schematic diagram of the method of decontaminating ballast water of the present invention in land/trailer mode using the heat treatment system as configured in FIG. 2.

The present invention also includes a method 200' of heat-treating ballast fluid to kill aquatic invasive species using the heat treatment system 100 described above, in the second configuration (land/trailer mode). This method 200' is shown in FIG. 4 and is similar in many ways to the method described above. However, there are some differences. For instance, an auxiliary heat source 18' must be connected to the vessel 10 to perform the land mode method 200', as shown in FIG. 2. When the auxiliary heat source 18' is connected, the control unit 11 receives a signal from the auxiliary heat source 18'. The auxiliary heat source 18' takes priority over the engine 20 in the decontamination methods described herein, such that the presence of the auxiliary heat source 18' overrides the engine-based operations of the method described above and ignores any engine-related readings regarding engine speed and temperature. Instead, the directions are based on the presence of the auxiliary heat source 18' and the ballast tanks and/or fluid therein.

Specifically, when decontamination is selected in the land/trailer mode of the heat treatment method 200', the control unit 11 pings the auxiliary heat source 18' to confirm the auxiliary heat source 18' is connected to the vessel 10, as at 212 in FIG. 4. The auxiliary heat source 18' may connect to the vessel 10 through the fill point 16, as shown in FIG. 2, though other connection points are also contemplated. For instance, the auxiliary heat source 18' may connect to each ballast tank 30, 40, 50 individually, such as those used by a decontamination or inspection station. If there is no response to the ping from the control unit 11, indicating the auxiliary heat source 18' is not connected, then the control unit 11 may direct decontamination according to the water mode method 200 described above and shown in FIG. 3. Alternatively, the user may be able to override and direct the manual use of the second land configuration despite a lack of a response from the auxiliary heat source 18', such as in the event the auxiliary heat source 18' is not in electronic communication with the control unit 11, such as those the decontamination and/or inspection station may use.

If the auxiliary heat source 18' is connected to the vessel 10 (or if the second land configuration is selected for manual operation), the land/trailer mode method 200' may continue by checking if the selected ballast tank(s) were decontaminated on the last run cycle, as at 214. This may be accomplished by referring to the history report(s) and the engine information to confirm the engine has not been started since the last time a decontamination protocol was performed on the selected ballast tanks. If the ballast tanks were decontaminated in the last run cycle, the control unit 11 sends a signal to the auxiliary heat source 18' to power down and do nothing.

However, if the engine has been turned on or if the ballast pumps have been operated since the last time the ballast tank(s) were decontaminated, then the method 200' continues with directing the diverter valves in the direction toward the auxiliary heat source, as at 222' in FIG. 4. The control unit 11 sends operative signals to the first and second diverter valves 14, 15 directing them to change configuration so they are directing fluid flow to and from the auxiliary heat source 18' rather than the onboard heat source 18. For instance, the first diverter valve 14 changes configuration to point fluid flow toward the fill point 16 through which the auxiliary heat source 18' is accessed. The second diverter valve 15 also changes configuration to receive fluid from the auxiliary heat source 18' when it reenters the vessel 10. In doing so, the onboard heat source 18 is bypassed in the land/trailer mode, the ballast fluid instead being routed to the auxiliary heat source 18' external to the vessel 10 when it is selectively connected. This may also be referred to as an external circuit.

With the external circuit established, the method 200' continues by checking to see if ballast fluid is present, as at 220. This step is the same as described above and is performed the same way. Once the selected tank(s) are confirmed as having ballast fluid, the method 200' continues with opening the input and output valves, as at 240, and activating the pump, as at 250, 250'. This may be the same as described above, such as when using the primary pump 13, as at 250, or it may be that the control unit 11 sends operative signals to activate the auxiliary pump 13' connected to the auxiliary heat source 18' rather than the onboard pump 13, as at 250'. In some embodiments, the external circuit may be configured so the onboard pump 13 is used to move ballast fluid through the external circuit as well as the internal circuit, such as if the onboard pump 13 is located upstream of the first diverter valve 14.

The rest of the method 200' is as described above, with the ballast fluid being pumped through the circuit and auxiliary heat source 18' while the control unit 11 monitors the temperature sensors 34, 44, 54 from the selected ballast tanks 30, 40, 50 until the temperature readings in the ballast tanks 30, 40, 50 are meet the predetermined temperature conditions, at which point the corresponding input and output valves are closed, as at 270, and the pump is deactivated, as at 280'. If the auxiliary pump 13' is being used, the pump is deactivated as at 280'. If the primary pump 13 is being used, the pump is deactivated as at 280. In either event, the control unit 11 then sends a message to the display 12 indicating that decontamination of the selected ballast tanks is complete, also as described above. History reports also include information as described above confirming that decontamination has occurred, which is available for review by inspection station personnel. The decontaminated ballast tanks 30, 40, 50 may then be drained or de-ballasted as directed by the control unit 11, such as by selecting the icon for "Drain All" 65 from the display 12, shown in FIG. 5.

Since many modifications, variations and changes in detail can be made to the described preferred embodiments, it is intended that all matters in the foregoing description and shown in the accompanying drawings be interpreted as illustrative and not in a limiting sense. Thus, the scope of the invention should be determined by the appended claims and their legal equivalents. Now that the invention has been described,

What is claimed is:

1. A system for decontaminating ballast fluid of a vessel, said system comprising:
   at least one ballast tank in said vessel, said at least one ballast tank dimensioned to receive and retain a volume of ballast fluid therein, each of said at least one ballast tank having a temperature sensor detecting and providing ballast fluid temperature information of said respective at least one ballast tank;
   an input valve in fluid flow communication with said at least one ballast tank, said input valve selectively positionable between an open position providing flow of said ballast fluid into said at least one ballast tank and a closed position restricting flow of said ballast fluid into said at least one ballast tank;
   an output valve in fluid flow communication with said at least one ballast tank, said output valve selectively positionable between an open position providing flow of said ballast fluid out of said at least one ballast tank and a closed position restricting flow of said ballast fluid out of said at least one ballast tank;
   an onboard heat source located on said vessel in fluid flow communication with said ballast fluid when said input and output valves are open, said onboard heat source receiving said ballast fluid from said at least one ballast tank and transferring heat to said ballast fluid when received therein;
   an auxiliary heat source located exterior to said vessel and selectively connectable to said vessel in fluid communication with said at least one ballast tank, said auxiliary heat source receiving said ballast fluid from said at least one ballast tank and transferring heat to said ballast fluid when received therein;

a first diverter valve in fluid flow communication with and upstream of said onboard heat source and a second diverter valve in fluid flow communication with and downstream of said onboard heat source, said first and second diverter valves selectively positionable to direct said ballast fluid to and away from a selected one of said onboard heat source or said auxiliary heat source;

a pump in fluid flow communication with said at least one ballast tank, said onboard heat source and said auxiliary heat source when selectively connected to said vessel, said pump (i) selectively activated to recirculate said ballast fluid between said at least one ballast tank and said selected heat source and (ii) selectively deactivated to cease recirculation of said ballast fluid, all based on predetermined ballast temperature conditions as detected by said temperature sensor in said at least one ballast tank; and a control unit of said vessel in electronic communication with each of said temperature sensor, said input valve, said output valve, said first diverter valve, said second diverter valve, said pump, and said auxiliary heat source when selectively connected to said vessel, said control unit configured to:

(iii) detect whether said auxiliary heat source is selectively connected to said vessel;

(iv) provide operative signals to said first and second diverter valves to assume a first configuration directing fluid flow to and from said onboard heat source, and to assume a second configuration directing fluid flow to and from said auxiliary heat source when said auxiliary heat source is detected;

(v) selectively activate and deactivate said pump;

(vi) monitor said ballast temperature conditions within said at least one ballast tank through communication with said temperature sensor; and (vii) generate at least one of a decontamination log and a decontamination record confirming decontamination of said ballast fluid in said at least one ballast tank.

2. The system as recited in claim 1, wherein said predetermined ballast temperature conditions are one of:
(i) said ballast fluid temperature information is 105° F. for at least 5 minutes; or
(ii) said ballast fluid temperature information is 140° F. for at least 10 seconds.

3. The system as recited in claim 1, further comprising a volumetric indicator associated with said at least one ballast tank, said volumetric indicator providing ballast fluid volume information of said at least one ballast tank.

4. The system as recited in claim 1, further comprising a tachometer providing engine speed information and an engine temperature sensor providing engine temperature information.

5. The system as recited in claim 4, wherein said onboard heat source is a heat exchanger in communication with an engine of said vessel, said onboard heat source receiving engine cooling fluid from said engine and said ballast fluid from said at least one ballast tank, and transferring heat from said engine cooling fluid to said ballast fluid when said ballast fluid is present within said onboard heat source.

6. The system as recited in claim 5, wherein said engine cooling fluid comprises coolant heated by said engine.

7. The system as recited in claim 1, further comprising an auxiliary pump located external to said vessel and in fluid flow communication with said auxiliary heat source.

8. The system as recited in claim 1, further comprising a display presenting status information of said system to a user and interactively receiving instructions for operating said system from the user.

9. The system as recited in claim 8, wherein said status information of said system is a report of heat treatment activity of said system.

10. The system as recited in claim 1, wherein said control unit is further configured to send operative instructions to selectively activate and deactivate said auxiliary heat source when selectively connected to said vessel.

11. A method for heat treating ballast fluid of at least one ballast tank of a vessel having an onboard heat source, said method comprising:

determining, by a control unit of said vessel, whether an auxiliary heat source is connected to said vessel;

selecting, by said control unit, one of (a) said onboard heat source when said auxiliary heat source is not determined, by said control unit, to be connected to said vessel, or (b) said auxiliary heat source when said auxiliary heat source is determined, by said control unit, to be connected to said vessel;

providing operative instructions by said control unit to diverter valves to direct fluid flow toward said selected heat source;

providing operative instructions by said control unit to input and output valves associated with said at least one ballast tank to open;

activating a pump in fluid flow communication with said at least one ballast tank and at least one of said onboard heat source and said auxiliary heat source;

recirculating said ballast fluid between said at least one ballast tank and said selected heat source;

receiving ballast fluid temperature information at said control unit from a ballast temperature sensor associated with said at least one ballast tank as said ballast fluid recirculates;

comparing, by said control unit, said ballast fluid temperature information to a predetermined temperature condition;

providing operative instructions by said control unit to said input and output valves to close and to said pump to deactivate when said ballast fluid temperature information matches said predetermined temperature condition; and providing, by said control unit, at least one of a decontamination log and a decontamination record confirming decontamination of said ballast fluid in said at least one ballast tank.

12. The method as recited in claim 11, wherein said predetermined temperature condition is one of:
(i) said ballast fluid temperature information is 105° F. for at least 5 minutes; or
(ii) said ballast fluid temperature information is 140° F. for at least 10 seconds.

13. The method as recited in claim 11, further comprising receiving ballast fluid volume information of said at least one ballast tank at said control unit from a volumetric indicator associated with said at least one ballast tank, and providing operative instructions by said control unit to said input and output valves to open and to said pump to activate when said ballast fluid volume information indicates ballast fluid is present within said at least one ballast tank.

14. The method as recited in claim 13, further comprising:
(i) receiving engine speed information at said control unit from a tachometer associated with an engine of said vessel;
(ii) receiving engine temperature information at said control unit from an engine temperature sensor associated with said engine; and
(iii) providing operative instructions by said control unit to said input and output valves to open and to said pump to activate when said engine speed information indicates said engine is running and said engine temperature information meets a predetermined engine temperature threshold.

15. The method as recited in claim 14, wherein said predetermined engine temperature threshold is one of 115° F. or 150° F.

16. The method as recited in claim 14, further comprising ignoring said engine speed information and said engine temperature information, by said control unit, when said auxiliary heat source is connected to said vessel.

17. The method as recited in claim 16, wherein said method is performed when said vessel is out of a body of water.

18. The method as recited in claim 11, further comprising providing operative instructions by said control unit to selectively activate and deactivate said auxiliary heat source when said auxiliary heat source is selected.

* * * * *